United States Patent
Franke et al.

(10) Patent No.: US 6,665,609 B1
(45) Date of Patent: Dec. 16, 2003

(54) METHOD FOR OPTIMIZING ENERGY IN THE MANNER IN WHICH A VEHICLE OR TRAIN IS DRIVEN USING A SLIDING OPTIMIZATION HORIZON

(75) Inventors: Rudiger Franke, Heidelberg (DE); Peter Terwiesch, Wohlenschwiel (CH); Markus Meyer, Ebikon (CH); Karl-Hermann Ketteler, Kleindoltingen (CH)

(73) Assignee: Bombardier Transporation GmbH, Berlin (DE)

( * ) Notice: Subject to any disclaimer, the term of this patent is extended or adjusted under 35 U.S.C. 154(b) by 0 days.

(21) Appl. No.: 10/031,418

(22) PCT Filed: Jul. 26, 2000

(86) PCT No.: PCT/EP00/07148
§ 371 (c)(1),
(2), (4) Date: Aug. 9, 2002

(87) PCT Pub. No.: WO01/08956
PCT Pub. Date: Feb. 8, 2001

(30) Foreign Application Priority Data

Jul. 29, 1999 (DE) .......................................... 199 35 352

(51) Int. Cl.$^7$ .............................................. G01C 21/26
(52) U.S. Cl. ........................ 701/201; 701/202; 701/204
(58) Field of Search ................................ 701/201, 202, 701/204, 208, 209, 213, 119, 99, 102, 110, 1, 19, 20, 36; 370/988, 990

(56) References Cited

U.S. PATENT DOCUMENTS 6,434,452 B1 * 8/2002 Gray ........................... 701/19
6,459,964 B1 * 10/2002 Vu et al. ...................... 701/19

FOREIGN PATENT DOCUMENTS

| DE | 129 761 A | 2/1978 |
|----|-----------|--------|
| DE | 30 26 652 A | 2/1982 |
| DE | 208 324 A | 5/1984 |
| DE | 236 705 A | 6/1986 |
| DE | 255 132 A | 3/1988 |
| DE | 262 836 A | 12/1988 |
| DE | 266 539 A | 4/1989 |
| DE | 197 26 542 A | 11/1998 |
| EP | 0 467 377 B | 1/1992 |

* cited by examiner

Primary Examiner—Richard M. Camby
(74) Attorney, Agent, or Firm—Howrey Simon Arnold & White

(57) ABSTRACT

A method is proposed for power optimization in a vehicle/train, using time reserves which are included when a schedule is planned, an overall route to be covered between a starting stop and a destination stop being subdivided into a number of sections and each section being assigned a specific time reserve. In order to achieve a power-saving travel mode with the aid of an optimization algorithm, in each case only a limited route area, comprising a predefined number of sections, is taken into consideration for the optimization. The results of the optimization are implemented only for the first section of the route area. The optimization calculation is repeated cyclically during the journey of the vehicle/train, the route area being considered being moved together with the vehicle.

1 Claim, 1 Drawing Sheet

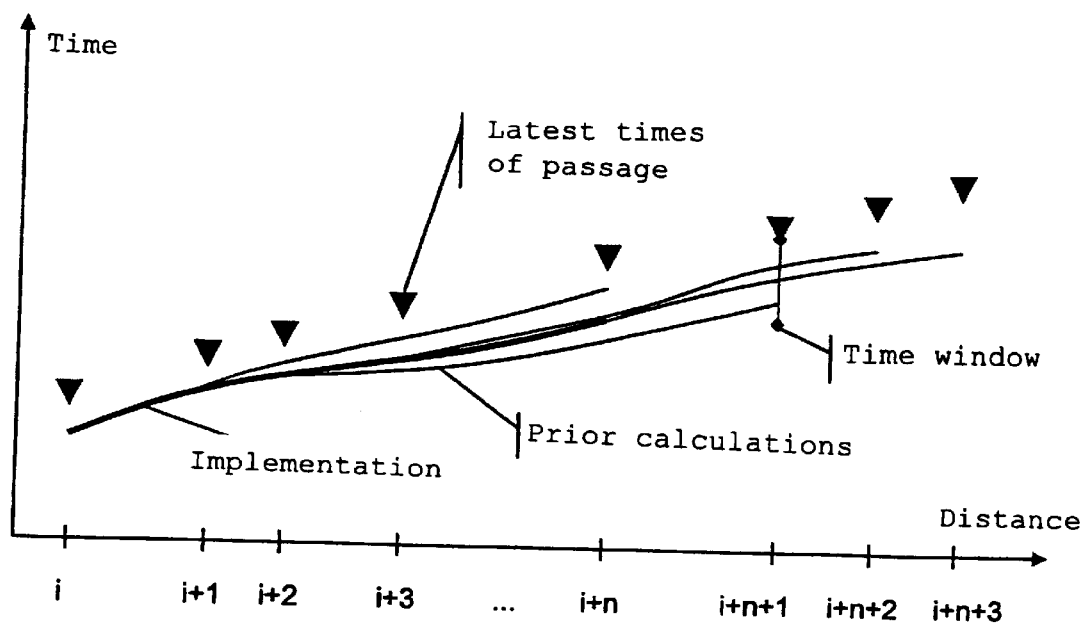

METHOD FOR OPTIMIZING ENERGY IN THE MANNER IN WHICH A VEHICLE OR TRAIN IS DRIVEN USING A SLIDING OPTIMIZATION HORIZON

BACKGROUND OF THE INVENTION

1. Field of the Invention

The invention relates to a method for power optimization of the travel mode in a vehicle/train having an overall route subdivided into a number of sections, according to the preamble of the single patent claim.

2. Description of the Related Art

When schedules for rail traffic are drawn up, time reserves for unforeseen events and adverse operating conditions are included in the plans. Since during real journeys the operating conditions are typically more favorable than assumed in the planning, the time reserves which arise become available for other purposes. A particularly practical use of the time reserves is the saving of power by means of a suitable travel mode of the vehicle/train.

BRIEF SUMMARY OF THE INVENTION

In this connection, DE 30 26 652 A1, DD 255 132 A1 and EP 0 467 377 B1 disclose methods relating to how a vehicle is moved in a power-optimal manner between two stops. In the case of long routes, a subdivision into a number of sections is proposed, an optimum partial solution being determined in each section, and the overall solution resulting from the combination of the partial solutions. The proposed methods for power optimization in each case take into consideration the overall route between two stops. However, no management of time reserves is carried out.

The uncertainty in the operating sequence, because the time reserves are provided in the schedule, is a maximum at the starting stop (starting station) and decreases continuously with increasing proximity to the destination stop (destination station). The operation of taking the decrease in uncertainty into account is traditionally carried out in route schedules in the form of times of passage for selected points on the route. At the same time, the time reserve is distributed uniformly over the overall route.

DE30 26 652 A1 and EP 0 467 377 B1 concern a system structure in which methods for power minimization can be realized, account being taken of an overall route between two stops (stop stations). In the case of long routes, this can lead to real-time predefinitions for the solution by the method disadvantageously not being complied with.

The previously known methods for power optimization take only inadequate account of the requirement for robustness of the operating sequence, which is to be increased using time reserves in the schedule. They are suitable only to an inadequate extent for use under real-time conditions.

The invention is based on the object of specifying an improved method for power optimization of the travel mode in a vehicle/train having an overall route subdivided into a number of sections.

This object is achieved, in conjunction with the features of the preamble, by the features specified in the defining part of the single claim.

The advantages which can be achieved by the invention consist in particular in the fact that the optimization calculation by means of an optimization algorithm is in each case carried out only for a limited route area. As a result, the necessary outlay on calculation is limited which permits the application of the optimization under real-time conditions, even over long overall routes. The robustness of the operating sequence is increased. At the same time, the travel mode implemented is power-optimal. "Robustness" means that, even in the case of long overall routes and unforeseen events, punctual arrival of the vehicle/train at the destination stop is ensured.

Further advantages of the proposed method emerge from the following description.

BRIEF DESCRIPTION OF THE DRAWINGS

The invention will be explained in more detail below using the exemplary embodiment illustrated in the single drawing.

DESCRIPTION OF THE ILLUSTRATIVE EMBODIMENTS

The FIGURE shows the distance/time diagram of a vehicle, the overall route being divided into a number of individual sections and i constituting the index for the individual sections. n refers to the expedient number of sections for a prior calculation. The respective latest times of passage are identified by triangles. In addition, a time window is indicated by way of example. The time window is used to determine at which earliest and latest time of passage a specific section is to be passed by the vehicle.

According to the invention, with the optimization calculation being carried out repeatedly during the journey, for respectively current conditions at each repetition, only a limited route section and not the overall route is taken into consideration.

For long routes with long-distance traffic it is pointless to calculate an optimum travel mode in advance up to the next destination stop, since a short-term, unforeseen change in the operating sequence, whose probability of occurrence increases with increasing route length, would already necessitate a recalculation. For this reason, according to the invention it is proposed to take into account only a limited route area in each case during a calculation. Predefinitions for the end time at which this route area must have been passed can be derived from the inclusion of the time reserves. The calculation is repeated cyclically during the journey, the route area being considered being moved together with the vehicle.

The single FIGURE illustrates the basic scheme of the method. While the vehicle is located in the section i, a previously determined, optimum control is used, the area from i to i+n having been considered in order to determine this optimum control, that is to say n corresponds to the number of sections for a prior calculation. While the vehicle is located in the section i, a recalculation is made for current conditions, the area from i+1 to i+n+1 now being considered. When the vehicle reaches the section i+1, the operation is continued with the results of this recalculation. This process is repeated cyclically. In each prior calculation, an area of n sections is considered, in each case only the results for the first section being implemented, since there is subsequently a new prior calculation (for the next section). Only when there are fewer than n sections between the vehicle and the destination stop is the optimization carried out over the remaining overall route.

Optimization algorithms which are suitable for the proposed method are known from Papageorgiou: Optimierung [Optimization], Chapters 10, 19 and in particular 20, Oldenbourg Verlag, 1996.

What is claimed is:

1. A method for power optimization in a vehicle traveling over a route between a start point and a destination, the route being subdivided into a number of sections and each section being assigned a specific time reserve, the method comprising:

determining a power-saving travel mode for the vehicle while the vehicle is located in a section, the travel mode being determined using an optimization algorithm for a portion of the route comprising a selected number n of contiguous sections further towards the destination than the section in which the vehicle is located, the number of section n being less than the number of sections in the route, the time reserves assigned to the selected sections being taken into account by the optimization algorithm; and either repeating the step of determining a power-saving travel mode when the vehicle moves into a further section along the route if at least n sections remain in the route; or determining a power-saving travel mode for the vehicle for all sections remaining in the route if less than n sections remain in the route.

* * * * *